United States Patent
Hussain et al.

(10) Patent No.: US 7,839,154 B2
(45) Date of Patent: Nov. 23, 2010

(54) POWERED DEVICE POWER CLASSIFICATION WITH INCREASED CURRENT LIMIT

(75) Inventors: Asif Hussain, Tustin, CA (US); Manisha Pandya, Anaheim Hills, CA (US)

(73) Assignee: Broadcom Corporation, Irvine, CA (US)

( * ) Notice: Subject to any disclaimer, the term of this patent is extended or adjusted under 35 U.S.C. 154(b) by 269 days.

(21) Appl. No.: 11/727,618

(22) Filed: Mar. 27, 2007

(65) Prior Publication Data

US 2008/0164884 A1 Jul. 10, 2008

Related U.S. Application Data

(60) Provisional application No. 60/878,662, filed on Jan. 5, 2007.

(51) Int. Cl.
*G06F 1/00* (2006.01)
*G05D 5/00* (2006.01)
*H02H 3/08* (2006.01)
*G01R 27/08* (2006.01)

(52) U.S. Cl. .................. 324/713; 713/300; 700/291; 361/93.7

(58) Field of Classification Search .................. None
See application file for complete search history.

(56) References Cited

U.S. PATENT DOCUMENTS

| | | | | |
|---|---|---|---|---|
| 6,047,380 | A * | 4/2000 | Nolan et al. | 713/324 |
| 2006/0049818 | A1 * | 3/2006 | Montgomery | 323/364 |
| 2006/0259798 | A1 * | 11/2006 | Stanford | 713/300 |
| 2007/0103829 | A1 * | 5/2007 | Darshan et al. | 361/90 |
| 2008/0005601 | A1 * | 1/2008 | Diab | 713/300 |
| 2008/0062586 | A1 * | 3/2008 | Apfel | 361/18 |
| 2008/0151457 | A1 * | 6/2008 | Apfel | 361/111 |

OTHER PUBLICATIONS 802.3af™, *IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-x and 1-121 (133 pages total).

* cited by examiner

*Primary Examiner*—Jeff Natalini
(74) *Attorney, Agent, or Firm*—Sterne, Kessler, Goldstein & Fox P.L.L.C.

(57) ABSTRACT

A system and method of classifying a high powered device (PD) with an increased current limit includes: connecting a voltage to the PD, measuring current through a classification resistor connected to the PD, and determining a PD classification signature based on the current according to classification steps such that a minimum classification step includes a minimum current of 0 mA and a maximum classification step includes a maximum current beyond a predetermined current limit. The system includes a PSE, voltage source, PD classification resistor, and PD voltage, connected to the P. An alternative embodiment further includes a discrete classification circuit and discrete classification resistor to be used to measure the current for classification purposes instead of the PD classification resistor when the PD and PD classification resistor do not support power classification under the classification scheme. The discrete classification circuit and discrete classification resistor can be located on-chip or off-chip.

30 Claims, 14 Drawing Sheets

POWER CLASSIFICATIONS
(IEEE 802.3af™ – 6/18/03)

| Class | Usage | Minimum Power Levels At Output of PSE |
|---|---|---|
| 0 | Default | 15.4 Watts |
| 1 | Optional | 4.0 Watts |
| 2 | Optional | 7.0 Watts |
| 3 | Optional | 15.4 Watts |
| 4 | Reserved for Future Use | Treat as Class 0 |

FIG. 6

PD POWER CLASSIFICATIONS
(IEEE 802.3af™ – 6/18/03)

| Class | Usage | Range of Maximum Power Used by the PD |
|---|---|---|
| 0 | Default | 0.44 to 12.95 Watts |
| 1 | Optional | 0.44 to 3.84 Watts |
| 2 | Optional | 3.84 to 6.49 Watts |
| 3 | Optional | 6.49 to 12.95 Watts |
| 4 | Not Allowed | Reserved for Future Use |

FIG. 7

PD CLASSIFICATION
(IEEE 802.3af™ – 6/18/03)

| Measured IClass | Classification |
|---|---|
| 0mA to 5mA | Class 0 |
| >5mA and <8mA | May be Class 0 or 1 |
| 8mA to 13mA | Class 1 |
| >13mA and <16mA | May be Class 0, 1, or 2 |
| 16mA to 21mA | Class 2 |
| >21mA and <25mA | May be Class 0, 2, or 3 |
| 25mA to 31mA | Class 3 |
| >31mA and <35mA | May be Class 0, 3, or 4 |
| 35mA to 45mA | Class 4 |
| >45mA and <51mA | May be Class 0 or 4 |

FIG. 8

CLASSIFICATION SIGNATURE, MEASURED AT PD INPUT (IEEE 802.3af™ – 6/18/03)

| Parameter | Conditions (V) | Minimum (mA) | Maximum (mA) |
|---|---|---|---|
| Current for Class 0 | 14.5 to 20.5 | 0 | 4 |
| Current for Class 1 | 14.5 to 20.5 | 9 | 12 |
| Current for Class 2 | 14.5 to 20.5 | 17 | 20 |
| Current for Class 3 | 14.5 to 20.5 | 26 | 30 |
| Current for Class 4 | 14.5 to 20.5 | 36 | 44 |

FIG. 9

EXEMPLARY .3at PD POWER CLASSIFICATIONS

| Class | Usage | Range of Maximum Power Used by the PD |
|---|---|---|
| 0 | Default (.3af) | 0.44 to 12.95 Watts |
| 1 | Optional (.3af) | 0.44 to 3.84 Watts |
| 2 | Optional (.3af) | 3.84 to 6.49 Watts |
| 3 | Optional (.3af) | 6.49 to 12.95 Watts |
| 4 | Default (.3af) / Reserved | 0.44 to 12.95 Watts |
| 5 | Optional (.3at) | 12.95 to 14.95 Watts |
| 6 | Optional (.3at) | 14.95 to 16.95 Watts |
| 7 | Optional (.3at) | 16.95 to 19 Watts |
| 8 | Optional (.3at) | 19 to 21 Watts |
| 9 | Optional (.3at) | 21 to 23 Watts |
| 10 | Optional (.3at) | 23 to 25 Watts |
| 11 | Optional (.3at) | 25 to 27 Watts |
| 12 | Optional (.3at) | 27 to 29 Watts |
| 13 | Optional (.3at) | 29 to 31 Watts |
| 14 | Optional (.3at) | 31 to 33 Watts |
| 15 | Default - High Power | 12.95 to 33 Watts |

FIG. 10

EXEMPLARY .3at CLASSIFICATION SIGNATURE, MEASURED AT PD INPUT

| Parameter | Conditions (V) | Minimum (mA) | Maximum (mA) |
|---|---|---|---|
| Current for Class 0 | 14.5 to 20.5 | 0 | 4 |
| Current for Class 1 | 14.5 to 20.5 | 9 | 12 |
| Current for Class 2 | 14.5 to 20.5 | 17 | 20 |
| Current for Class 3 | 14.5 to 20.5 | 26 | 30 |
| Current for Class 4 | 14.5 to 20.5 | 36 | 44 |
| Current for Class 5 | 14.5 to 20.5 | 50 | 58 |
| Current for Class 6 | 14.5 to 20.5 | 64 | 72 |
| Current for Class 7 | 14.5 to 20.5 | 78 | 86 |
| Current for Class 8 | 14.5 to 20.5 | 92 | 100 |
| Current for Class 9 | 14.5 to 20.5 | 106 | 114 |
| Current for Class 10 | 14.5 to 20.5 | 120 | 128 |
| Current for Class 11 | 14.5 to 20.5 | 134 | 142 |
| Current for Class 12 | 14.5 to 20.5 | 148 | 156 |
| Current for Class 13 | 14.5 to 20.5 | 162 | 170 |
| Current for Class 14 | 14.5 to 20.5 | 176 | 184 |
| Current for Class 15 | 14.5 to 20.5 | 190 | 198 |

POWERED DEVICE POWER CLASSIFICATION WITH INCREASED CURRENT LIMIT

CROSS REFERENCE TO RELATED APPLICATIONS

This application claims benefit of U.S. Provisional Patent Appl. No. 60/878,662, filed on Jan. 5, 2007, which is incorporated by reference herein in its entirety.

BACKGROUND OF THE INVENTION

1. Field of the Invention

The present invention generally relates to power transfer to Power over Ethernet (PoE) devices (or Powered Devices (PD)). More specifically, the present invention provides a power classification system and method with an increased current limit for high power PoE/PD devices.

2. Related Art

Currently, the IEEE 802.3af™ standard (IEEE Amendment, Jun. 18, 2003) only supports power classification up to 15.4 watts per port. However, there is currently a demand to power higher power devices (for example, wireless access points and internet protocol phones), which can consume more power than the IEEE 802.3af™ standard supports. Thus, for these higher power PoE/PD devices, increasing the power classification current limit currently imposed by the IEEE 802.3af™ standard is one way to add more power classes. To do this while also supporting the current standard, the number of classifications will need to increase beyond the five classes (class 0 to class 4) currently defined. An effort to minimize power dissipation on a die is also needed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 6 is a table showing the current IEEE 802.3af™ standard of power classifications for minimum power levels at the output of a PSE.

FIG. 7 is a table showing the current IEEE 802.3af™ standard of PD power classifications for ranges of maximum power used by the PD.

FIG. 8 is a table showing the current IEEE 802.3af™ standard of PD power classification based on the current.

FIG. 9 is a table showing the current IEEE 802.3af™ standard of classification signatures for current measured at the PD input.

FIG. 10 is a table showing exemplary PD power classifications for ranges of maximum power used by the PD, to be used in accordance with embodiments of the present invention.

FIG. 11 is a table showing exemplary classification signatures for current measured at the PD input, to be used in accordance with embodiments of the present invention.

DETAILED DESCRIPTION OF THE INVENTION

Figure 1:
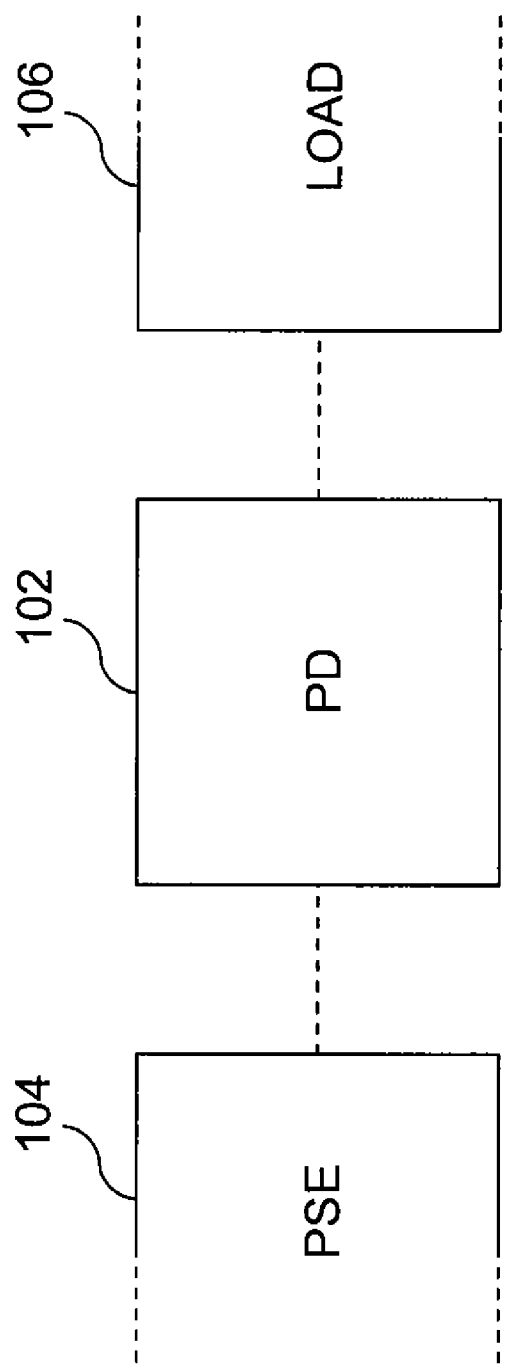
FIG. 1 is a block diagram of a conventional PD chip architecture.

The following discussion describes power classification for power transfer to Power over Ethernet (PoE) devices (or Powered Devices (PD)). FIG. 1 illustrates a conventional powered device chip architecture 100, with a powered device chip (PD) 102 connected to a power sourcing equipment chip (PSE) 104 and a load 106. The PSE 104 monitors and controls the application of power to the PD 102. More specifically, a PSE detects and validates a compatible PD, optionally determines a power classification for the validated PD, supplies power to the PD, monitors the power, and reduces or removes the power from the PD when the power is no longer requested or required. During detection, if the PSE finds the PD to be non-compatible (not valid), the PSE can prevent the application of power to that PD device, protecting the PD from possible damage. IEEE has imposed standards on the detection, power classification, and monitoring of a PD by a PSE in the IEEE 802.3af™ standard, as will be discussed in more detail throughout this specification.

Figure 2:
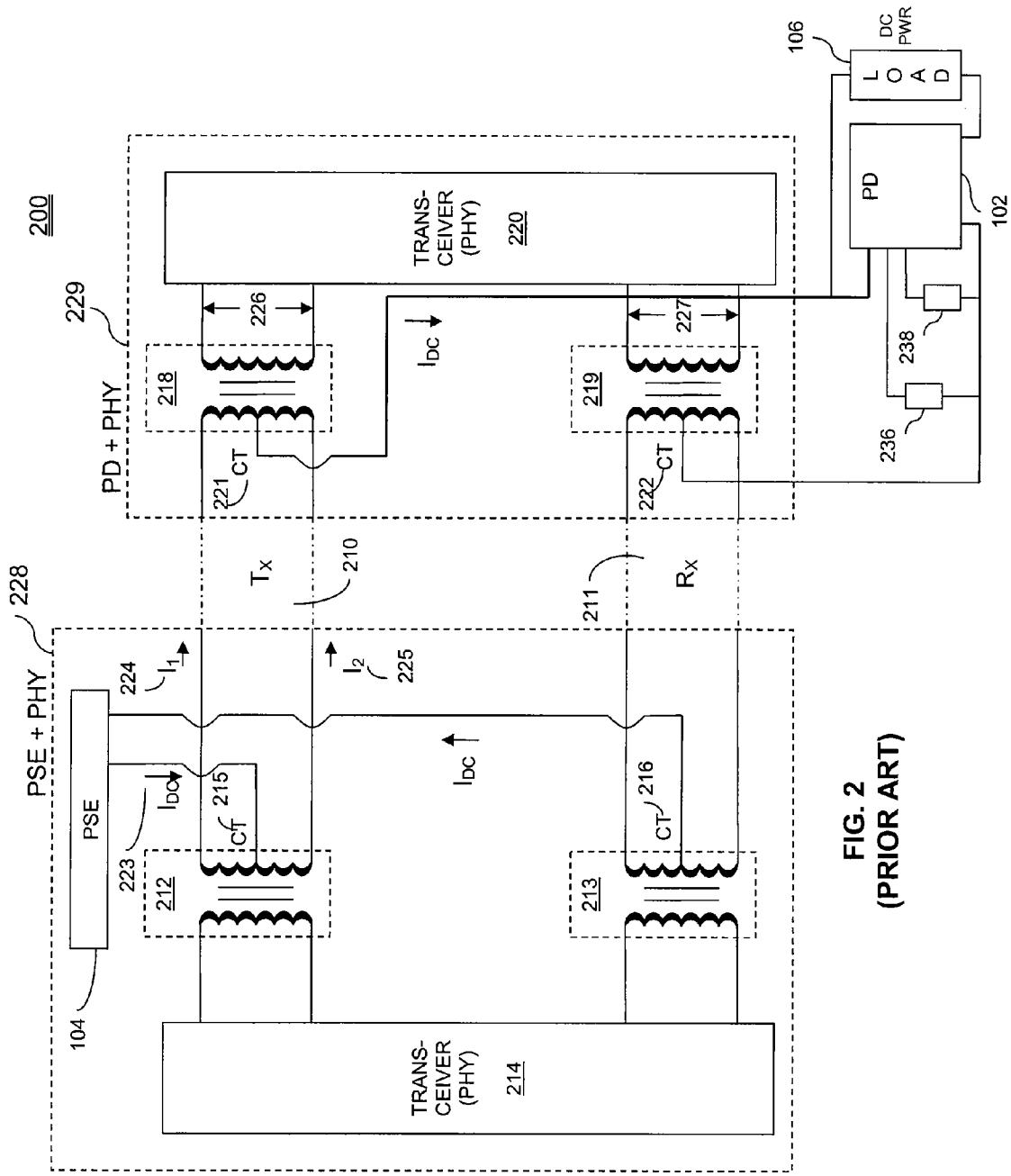
FIG. 2 illustrates conventional power transfer from a PSE chip to a PD chip.

Power transfer includes the transferring of high speed data over Ethernet from one differential port (at the PSE side, for example) to another differential port (at the PD side, for example). FIG. 2 shows a typical, more detailed, circuit for power transfer over a communication system to PD 102 that is remotely located relative to PSE 104. PSE interface 104 provides direct current (DC) to PD 102 over communication mediums 210 and 211 via PSE PHY 228 and PD PHY 229. Each communication medium 210/211 can include a pair of communication conductors (e.g., twisted pair conductors found in Ethernet cable). PSE PHY 228 has a first transformer 212 and a second transformer 213 that provide for transport of communication signals to communication medium 210 and communication medium 211 from a PSE transceiver 214. The first transformer 212 has a first center tap 215. The second transformer 213 has a second center tap 216. The first center tap 215 and the second center tap 216 are connected to PSE interface 104. The first center tap 215 and second center tap 216 are connected respectively on sides of the first transformer 212 and second transformer 213, which are connected respectively to communication medium 210 and communication medium 211.

PD PHY 229 has a third transformer 218 and a fourth transformer 219 that connect a transceiver 220 to communication medium 210 and communication medium 211. The third transformer 218 has a third center tap 221. The fourth transformer 219 has a fourth center tap 222. PD 102 receives DC power from the third center tap 221 and the fourth center tap 222 over communication medium 210 and communication medium 211, respectively.

During ideal operation, a direct current ($I_{DC}$) 223 flows from PSE interface 104 through the first center tap 215, and divides into a first current ($I_1$) 224 and a second current ($I_2$)

225 carried over communication medium 210. Note that the direction of current flow may change, according to the selected pin out (Alternative A-MDI or Alternative A-MDIX, for example). The first current ($I_1$) 224 and the second current ($I_2$) 225 then recombine at the third center tap 221 to reform the direct current ($I_{DC}$) 223 to power PD 102. On return, the direct current ($I_{DC}$) 223 flows from PD 102 through the fourth center tap 222, divides for transport over communication medium 211, recombines at the second center tap 216, and returns to PSE interface 104. While power is being supplied, a first communication signal 226 and/or a second communication signal 227 are simultaneously carried via communication medium 210 and communication medium 211. FIG. 2 also shows a signature resistor 236 and a classification resistor 238 connected to PD 102. Signature resistor 236 is used to validate PD 102, and classification resistor 238 is used for power classification of PD 102, as will now be discussed.

Figure 3:
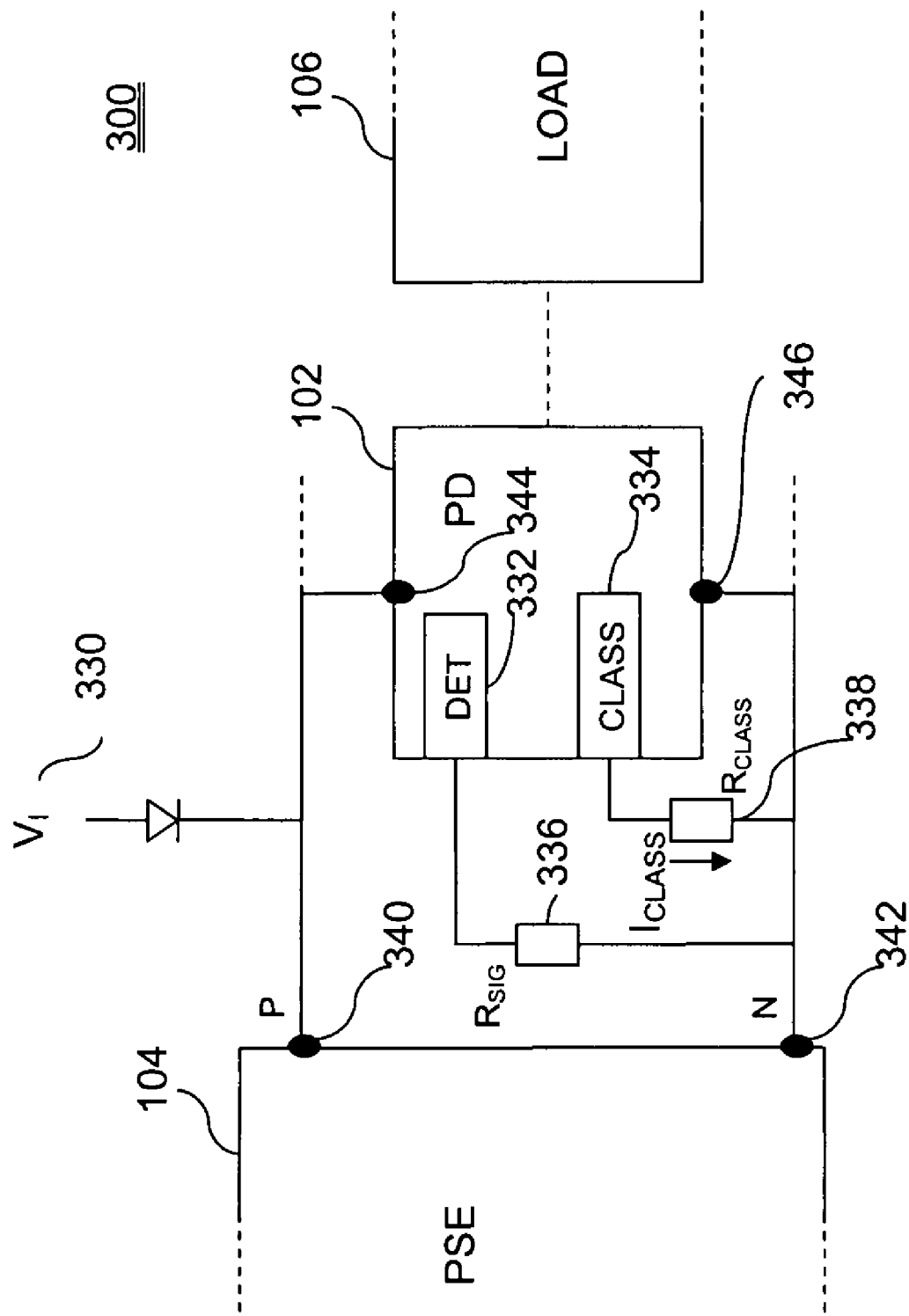
FIGS. 3 and 4 are illustrations of a PD chip architecture with a device detection and power classification system.

Power classification will be introduced with reference to FIG. 3, which illustrates PD chip architecture 300. As shown in FIG. 3, positive terminal 340 of PSE 104 is connected to a first terminal 344 of PD 102, and negative terminal 342 of PSE 104 is connected to a second terminal 346 of PD 102. (For the sake of simplicity, bridge rectifiers and series diodes are not considered.) A voltage source 330 is connected to the positive terminal 340 of PSE 104 to provide input voltage $V_I$. According to the IEEE 802.3af™ standard, the operating voltage should range from 44V to 57V.

As shown in FIG. 3, PD 102 includes detection circuitry 332 and classification circuitry 334. A signature resistance 336 is located between detection circuitry 332 and the negative terminal 342 of PSE 104. Signature resistance 336 is used to determine the validity of PD 102, as will be described in more detail below. A classification resistor 338 is located between classification circuitry 334 and the negative terminal 342 of PSE 104. Current ($I_{CLASS}$) through the classification resistor 338 determines the power classification signature for PD 102, as will also be discussed in more detail below.

Figure 4:
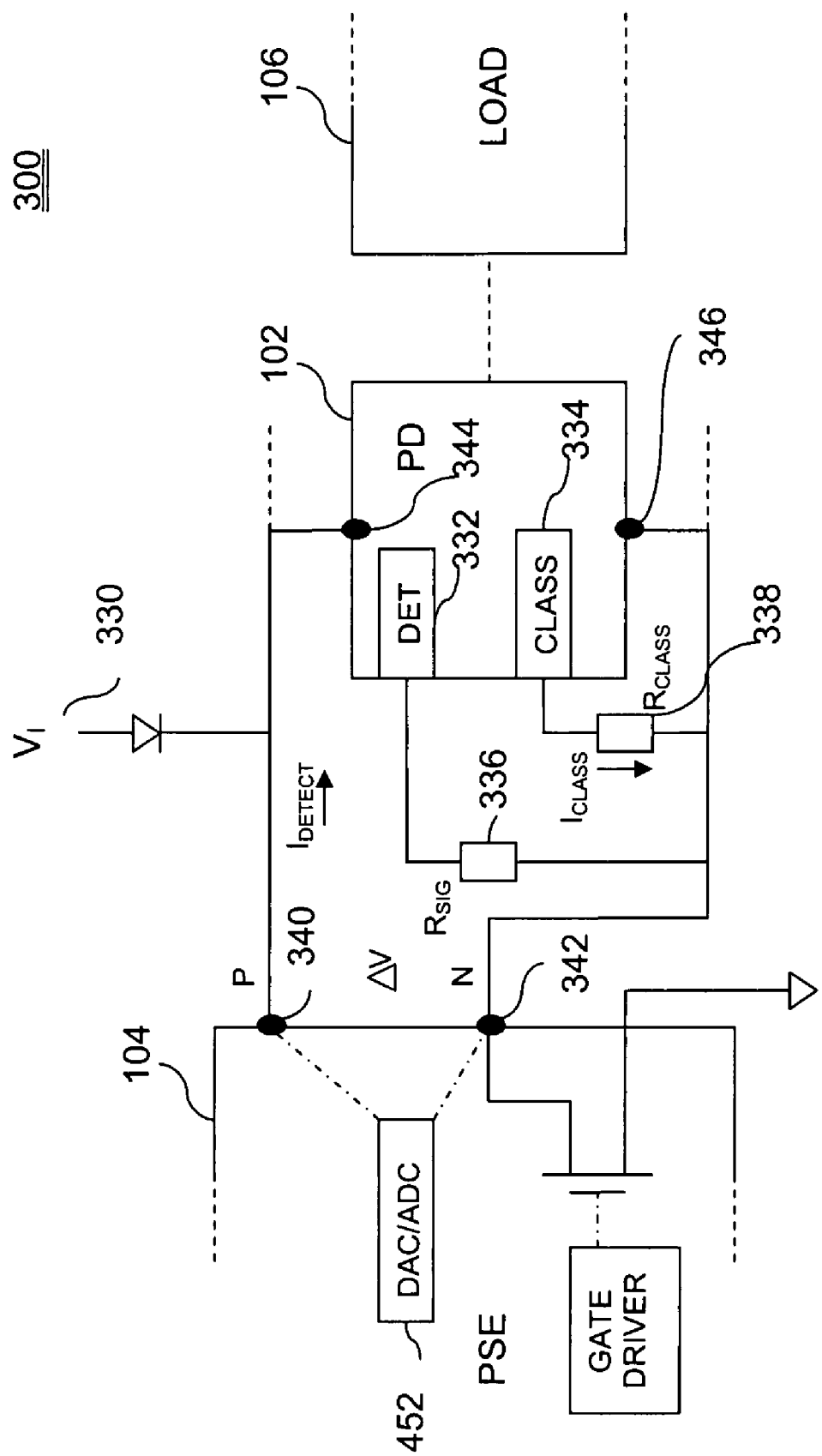

Before power is supplied to PD 102, PSE 104 first determines whether PD 102 is a valid device. This is called 'detection,' and will be described with reference to FIG. 4. For detection, PSE 104 probes for the signature resistor. Either voltage or current methods can be used for this resistor detection. For example, PSE 104 can measure the current ($I_{DETECT}$) using an internal digital-to-analog converter 452 connected to positive terminal 340. In addition, PSE 104 can probe for the voltage drop ($\Delta V$) between positive terminal 340 and negative terminal 342 using an internal analog-to-digital converter 452, for example. If $R_{SIG}$ is calculated to be an expected value (e.g., approximately 25K ohms, or within a specified resistance value range), then PD 102 is deemed a valid device. If PD 102 is deemed a non-valid device, then power will not be supplied to PD 102.

After detection of a valid PD, power classification occurs. Power classification is used to determine the range of minimum power needed at the output of PSE 104 and, in turn, the range of maximum power to be used by PD 102, according to IEEE 802.3af™. For power classification, PSE 104 applies a voltage to PD 102. For voltage applied to PD 102 by PSE 104 ranging from 14.5V to 20.5V, IEEE 802.3af™ currently defines four classifications (classes 0-3) of power ranges, with a fifth classification (class 4) reserved for future use (but currently treated as class 0). These power classifications are shown in the tables of FIGS. 6 and 7. As shown in FIGS. 6 and 7, the minimum power level at the output of the PSE is defined to be as high as 15.4 watts, and the maximum power used by the PD is defined to be as high as 12.95 watts. In order to classify the PD to the appropriate power range, the current ($I_{CLASS}$) is measured through classification resistor 338. IEEE 802.3af™ has defined PD classifications 0-4 for current ranging from 0 mA to 51 mA, as shown in the table of FIG. 8. IEEE 802.3af™ has also defined classification signatures for classes 0-4, measured at the PD input, as shown in the table of FIG. 9. Thus, the current IEEE standard supports PD power classification for up to 15.4 watts of power at the output of the PSE and up to 51 mA of current measured through classification resistor 338. Although sufficient for low-power devices, current PDs need to support up to 25 watts of power or more. Because there is currently no standard for power greater than 15.4 watts, further classifications need to be defined that support higher power and support currents higher than the present current limit. The PD power classification scheme presented in the following paragraphs accomplishes this.

As shown in the table of FIG. 10, an example of a PD power classification scheme employed by this invention expands on the table of FIG. 7 by defining additional classifications to cover higher levels of power. The example scheme shown displays parameters for classes 0-3 identical to those shown in FIG. 7 to support the current standard, and further defines classes 4-15 for higher levels of power. The table of FIG. 11 shows an example of a PD power classification signature, as measured at the PD input, for current ranging from 0 mA to approximately 200 mA (198 mA) to correspond with the classes defined in FIG. 10. As can be seen in FIG. 11, the current ranges shown for classes 0 to 4 are identical to those found in FIG. 9 to support the current standard up to 44 mA, and classes 5-15 were added under the same voltage condition for additional current ranges up to 198 mA.

The power classification scheme shown in FIG. 11 is just one example of a power classification scheme that would support higher power PDs. As would be understood by those skilled in the relevant art(s), any number of classifications could be used. In addition, a number of different schemes could be used that would still cover up to a particular maximum current limit (e.g., 200 mA as exemplified herein). For instance, the number of classes could be different if the current range within each class were different. The exemplary scheme shows a current range of 8 mA within each of additional classes 5-15. If the current range within each class was reduced, more classifications would result. Alternatively, if the current range within each class was increased, less classifications would result. Similarly, the number of classes could be different if the gap between the current ranges of each class were different. The exemplary scheme shows a current range gap of 6 mA between the current ranges of additional classes 5-15. If the current range gap between the classes were reduced, more classifications would result. Alternatively, if the current range gap between the classes were increased, less classifications would result. Thus, many schemes could fit the parameters discussed here with respect to embodiments of the present invention.

Figure 12:
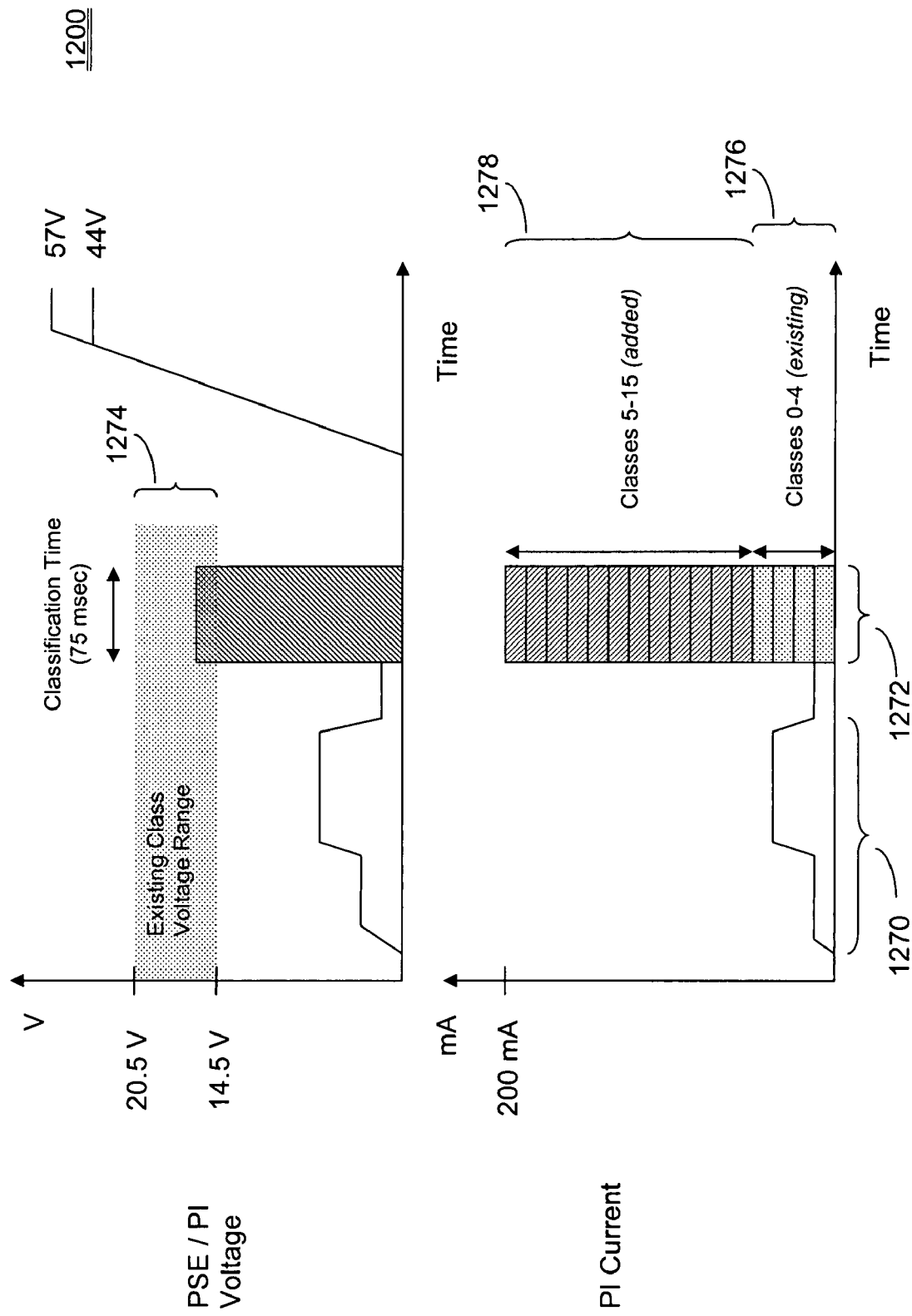
FIG. 12 is a chart showing the PSE/Power Interface (PI) voltage and current versus time during detection and classification, in accordance with embodiments of the present invention.

FIG. 12 shows two aligned timing event charts 1200 representing PSE/PI voltage over time and PI current over time. In both charts, the time period indicated by reference 1270 represents the time it takes for PD detection, and the time period indicated by reference 1272 represents the time it takes for PD power classification. The power classification time 1272 is shown as a maximum 75 msec. However, according to IEEE 802.3af™, this time can range from 10 msec to 75 msec.

In the PSE/PI voltage portion of the chart in FIG. 12, the voltage range indicated by reference 1274 represents the voltage applied to the PD by the PSE during classification, ranging from 14.5V to 20.5V according to IEEE 802.3af™. The application of a voltage within this range is to remain the same (14.5V to 20.5V) for embodiments of the present invention described herein. However, other voltage ranges could be used.

In the PI current portion of the chart in FIG. 12, the power classification is shown to range from 0 mA to approximately 200 mA, similar to that shown in the table of FIG. 11. The first five classes shown (classes 0-4, indicated by reference 1276) represent the existing classes shown in the table of FIG. 9. The remaining classes (classes 5-15, indicated by reference 1278) represent the new classes added as shown in the table of FIG. 11.

Figure 5:
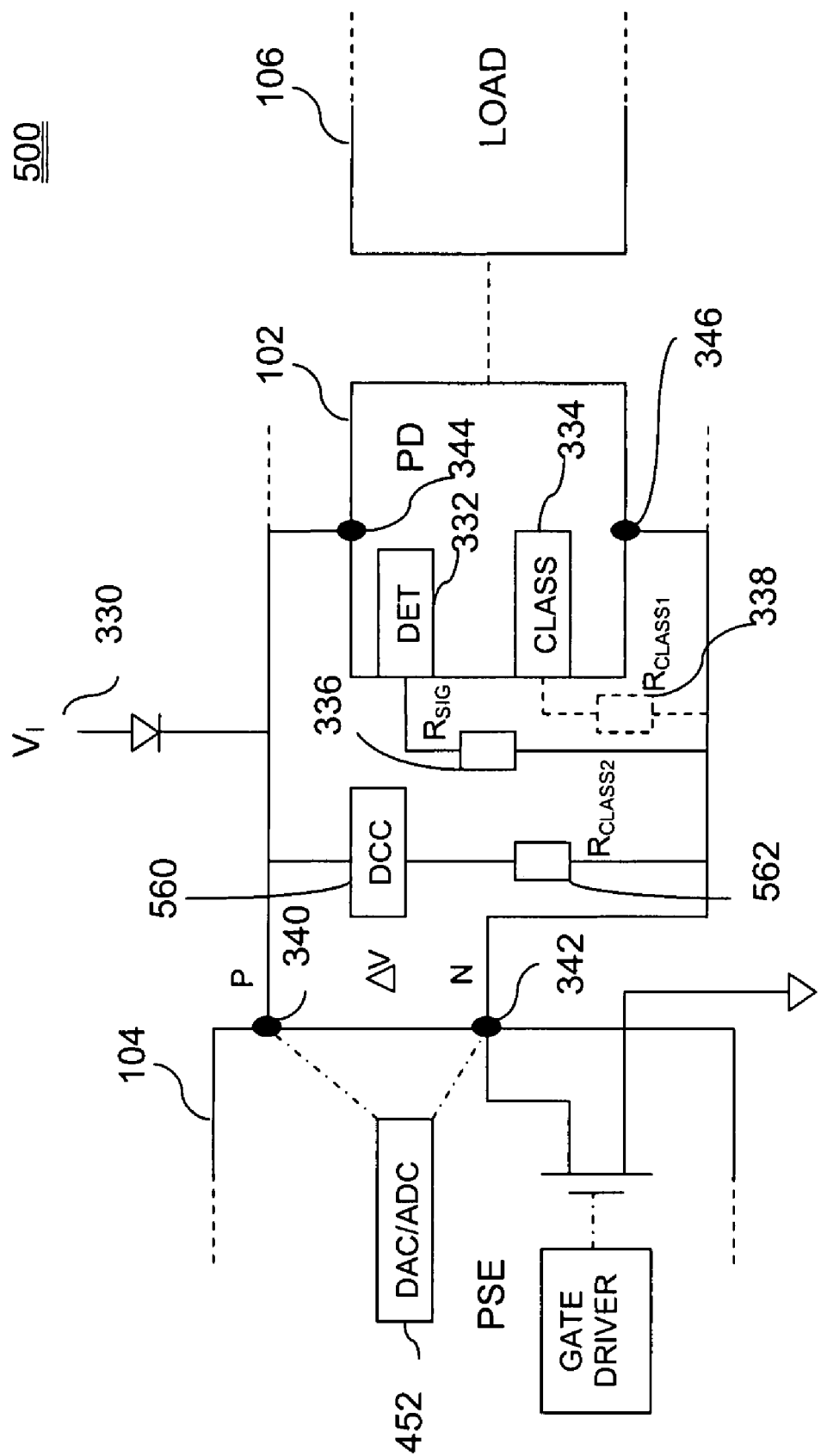
FIG. 5 illustrates an embodiment of the device detection and power classification system in which a discrete classification circuit and classification resistor are connected.

The power classification scheme shown in FIGS. 10 and 11, for example, enable PD chips to include smaller classification resistors. However, PD chips are manufactured and sold independently by various vendors. In order to enable the exemplary power classification scheme, or one similar, to be used with any PD chip (including legacy PD chips), a discrete classification circuit can be included to provide an interface between a PSE and a PD chip. This alternative embodiment includes, in series, a discrete classification circuit 560 and a discrete classification resistor 562 (also denoted as $R_{CLASS2}$) placed across the positive terminal 340 and negative terminal 342 of PSE 104 (on the PD side), as shown in FIG. 5 (depicting PD chip architecture 500). Instead of using classification resistor 338 (also denoted in FIG. 5 as $R_{CLASS1}$) to measure the current for power classification purposes, current is alternatively measured through the discrete classification circuit 560/discrete classification resistor 562 in order to allow a translation of the power classification scheme. The discrete classification circuit 560/discrete classification resistor 562 combination can be either an on-chip or off-chip interface.

Figure 13:
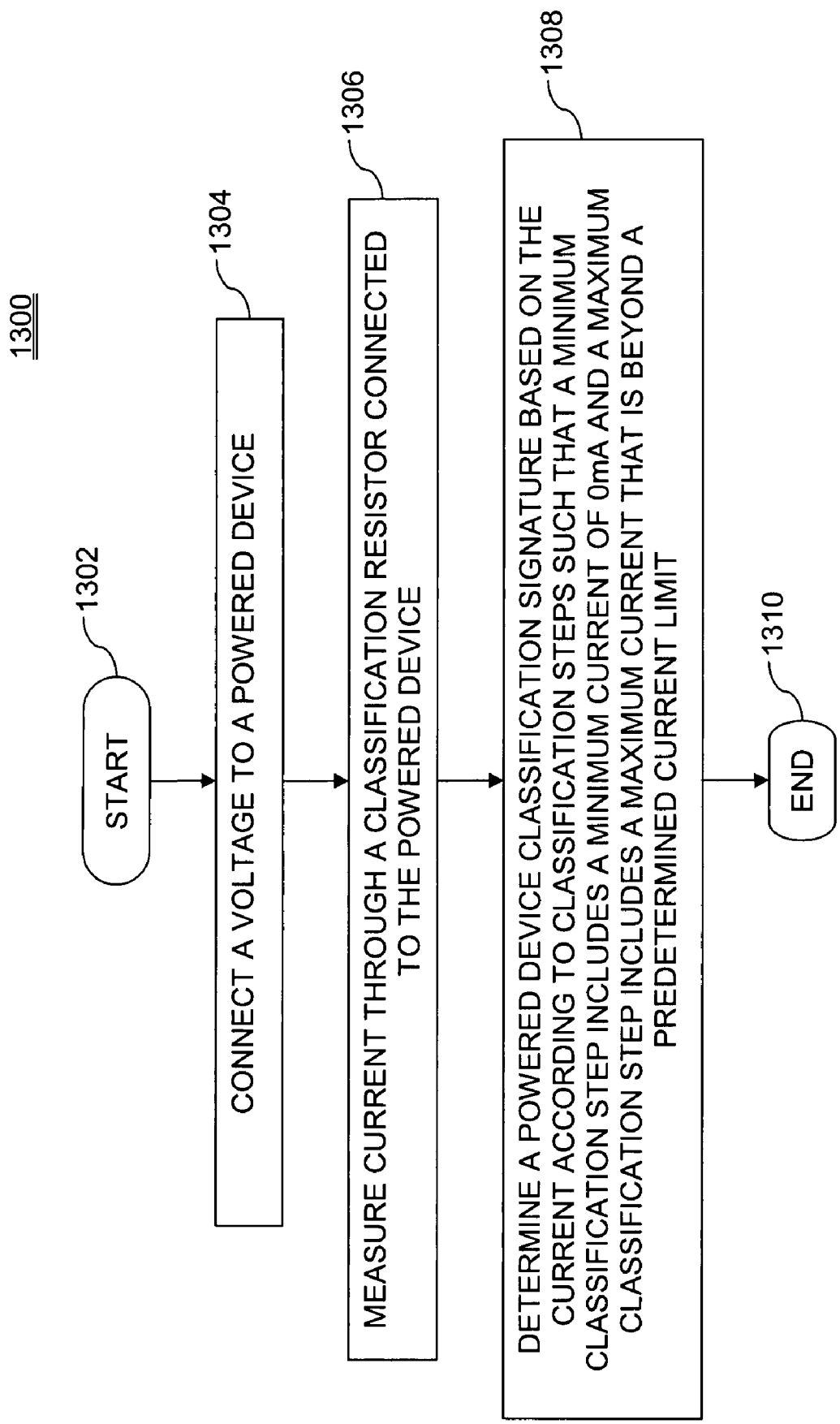
FIG. 13 is a flowchart illustrating a method of classifying power for a PD, with an increased current limit, according to embodiments of the present invention.

FIG. 13 provides a flowchart 1300 that illustrates operational steps of a method for classifying power for a powered device with an increased current limit. The invention is not limited to this operational description. Rather, it will be apparent to persons skilled in the relevant art(s) from the teachings herein that other operational steps may be within the scope and spirit of the present invention. In the following discussion, the steps in method 1300 are described.

Method 1300, a method of classifying a powered device, begins at step 1302. At step 1304, a voltage is connected to a powered device (PD) by power sourcing equipment (PSE). According to IEEE 802.3af™, the voltage applied should range from 14.5V to 20.5V, with current limited to 100 mA or less to a power interface (PI). At step 1306, current is measured through a classification resistor connected to the powered device. In step 1308, a PD classification signature is determined by the PSE based on the measured current according to classification steps such that a minimum classification step includes a minimum current of 0 mA and a maximum classification step includes a maximum current that is beyond a predetermined current limit (e.g., such as that defined in the current IEEE standard). Method 1300 ends at step 1310.

Figure 14:
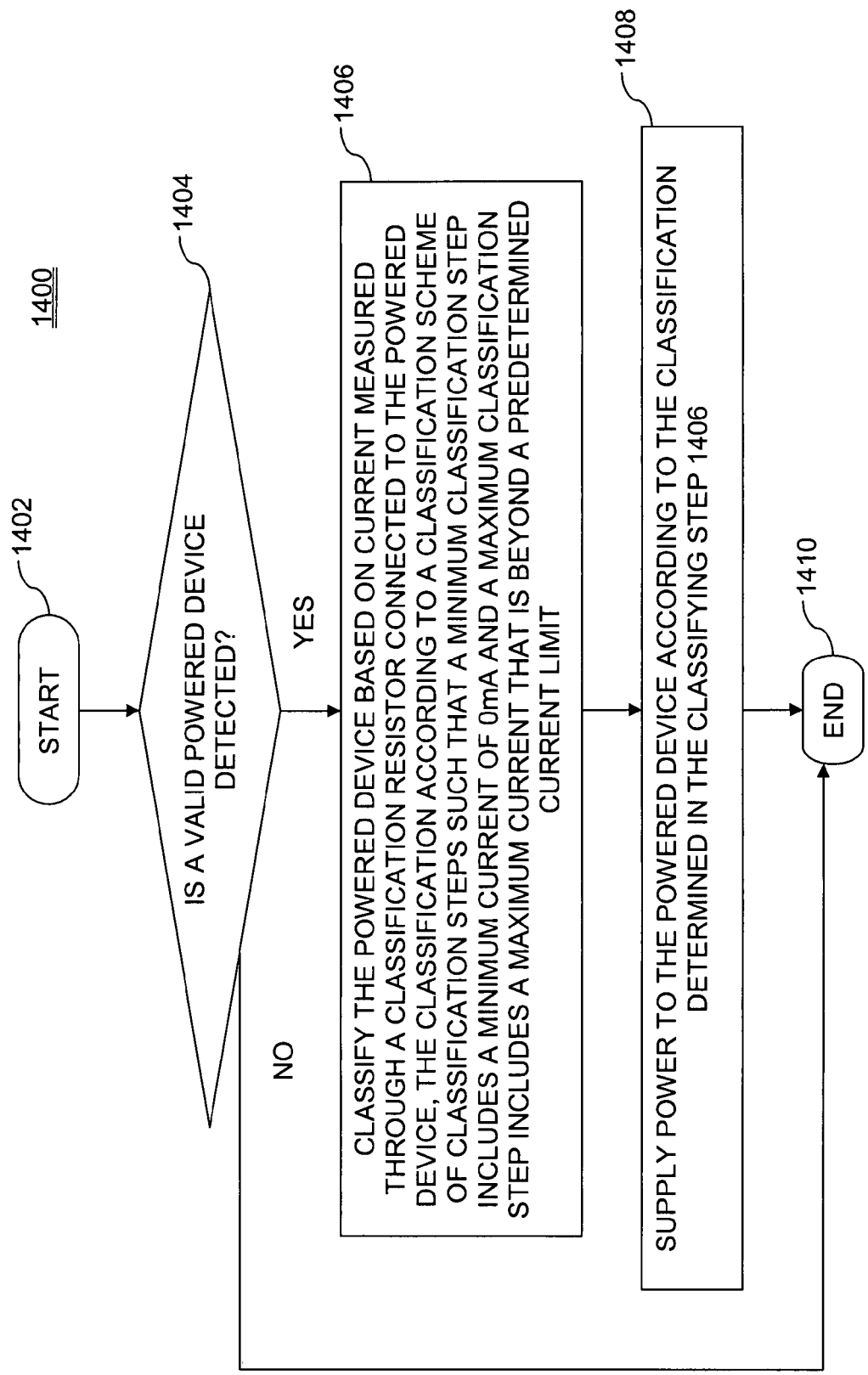
FIG. 14 is a flowchart illustrating a method of supplying power to a PD, with an increased current limit, according to embodiments of the present invention.

FIG. 14 provides a flowchart 1400 that illustrates operational steps of a method for classifying and supplying power to a powered device with an increased current limit. The invention is not limited to this operational description. Rather, it will be apparent to persons skilled in the relevant art(s) from the teachings herein that other operational steps may be within the scope and spirit of the present invention. In the following discussion, the steps in method 1400 are described.

Method 1400 begins at step 1402. At step 1404, the powered device (PD) is detected by power sourcing equipment (PSE). In this step, the PSE determines whether the PD is a valid device. If it is determined that the PD is not a valid device, method 1400 ends (step 1410) with no power being delivered to the PD. Otherwise, method 1400 continues at step 1406. At step 1406, the PD is classified based on current measured through a classification resistor connected to the PD. The classification of the PD is according to a classification scheme of classification steps such that a minimum classification step includes a minimum current of 0 mA and a maximum classification step includes a maximum current that is beyond a predetermined current limit. In step 1408, power is supplied to the PD according to the determined classification. Method 1400 ends at step 1410. An example of a PD power classification signature that fits the parameters of methods 1300/1400 is shown in the table of FIG. 11.

The flowcharts 1300/1400 and the PD power classification signature of FIG. 11, for example, illustrate methods in which powered devices can be classified under a power classification scheme that complies with IEEE 802.3af™, for example, for low-power devices while providing additional classifications for the higher power demand of high-power devices. Another advantage of the present invention is that it is easily implemented at both the PSE and the PD sides.

Minimizing power dissipation on a die is an important consideration for embodiments of the present invention. The IEEE 802.3af™ standard is supported when the voltage connected to the power device ranges from 14.5V to 20.5V and current is limited to 100 mA or less to the power interface (PI). In order to minimize power dissipation, the voltage connected should be as close as possible to the maximum 20.5V. Similarly, the IEEE 802.3af™ standard is supported when the classification time ranges from 10 msec to 75 msec. In order to minimize power dissipation, the classification time should be as close as possible to the minimum 10 msec.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method of classifying a high powered device, the method comprising:
   connecting a specified voltage to the powered device;
   measuring current through a discrete classification resistor connected in series with a discrete classification circuit, the discrete classification resistor and discrete classification circuit connected between first and second terminals of the powered device such that a first terminal of the discrete classification circuit is connected to the first terminal of the powered device, a second terminal of the discrete classification circuit is connected to a first terminal of the discrete classification resistor, and a second terminal of the discrete classification resistor is connected to the second terminal of the powered device; and
   determining a powered device classification signature based on the current according to classification steps such that a minimum classification step includes a minimum current of 0 mA and a maximum classification step includes a maximum current that is beyond a predefined current limit.

2. The method of claim 1, wherein the predefined current limit is defined by a current IEEE standard of power classification.

3. The method of claim 2, wherein the determining step comprises:

classifying the powered device in a class as defined in the current IEEE standard.

4. The method of claim 2, wherein the determining step comprises:
classifying the powered device in a class beyond those defined in the current IEEE standard.

5. The method of claim 1, wherein the predefined current limit is defined by the IEEE 802.3af™ standard.

6. The method of claim 1, wherein the determining step comprises:
classifying the powered device in one of classes 0 to 4 for current ranging from 0mA to approximately 51 mA in support of the IEEE 802.3af™ standard.

7. The method of claim 6, wherein the determining step comprises:
classifying the powered device in a class beyond class 4 for current of approximately 51 mA or more.

8. The method of claim 1, wherein the determining step comprises classifying the powered device in one of the following classes:
class 0 for 0 mA to 4 mA;
class 1 for 9 mA to 12 mA;
class 2 for 17 mA to 20 mA;
class 3 for 26 mA to 30 mA;
class 4 for 36 mA to 44 mA;
class 5 for 50 mA to 58 mA;
class 6 for 64 mA to 72 mA;
class 7 for 78 mA to 86 mA;
class 8 for 92 mA to 100 mA;
class 9 for 106 mA to 114 mA;
class 10 for 120 mA to 128 mA;
class 11 for 134 mA to 142 mA;
class 12 for 148 mA to 156 mA;
class 13 for 162 mA to 170 mA;
class 14 for 176 mA to 184 mA; and
class 15 for 190 mA to 198 mA.

9. The method of claim 1, further comprising detecting powered device validity.

10. The method of claim 9, wherein the detecting step comprises:
probing for a powered device with a voltage;
measuring a powered device classification current; and
calculating a signature resistance at the powered device based on the powered device classification current and powered device voltage.

11. The method of claim 10, wherein the detecting step determines that a powered device is valid if the signature resistance at the powered device is calculated to be a specified value.

12. A power classification system for classifying power for a powered device, the power classification system comprising:
power sourcing equipment, including a positive terminal and a negative terminal, the positive terminal connected to a first terminal of the powered device and the negative terminal connected to a second terminal of the powered device;
a voltage source connected to the positive terminal and to the first terminal of the powered device;
a powered device classification resistor having a first terminal and a second terminal, the first terminal of the powered device classification resistor connected to a third terminal of the powered device, and the second terminal of the powered device classification resistor connected to the negative terminal and to the second terminal of the powered device;
a powered device voltage applied between the first terminal of the powered device and the first terminal of the powered device classification resistor;
a discrete classification circuit having a first terminal and a second terminal, the first terminal of the discrete classification circuit connected to the first terminal of the powered device; and
a discrete classification resistor having a first terminal and a second terminal, the first terminal of the discrete classification resistor connected to the second terminal of the discrete classification circuit, and the second terminal of the discrete classification resistor connected to the second terminal of the powered device.

13. The system of claim 12, wherein the power sourcing equipment includes:
a digital-to-analog converter (DAC); and
an analog-to-digital converter (ADC),
wherein a signature resistance at the powered device is calculated based on a powered device current measured by the DAC at the positive terminal and a powered device voltage drop probed for by the ADC between the positive terminal and the negative terminal.

14. The system of claim 13, wherein the powered device is determined to be valid if the signature resistance is calculated to be a specified value.

15. The system of claim 12, wherein the discrete classification circuit and discrete classification resistor are located on-chip.

16. The system of claim 12, wherein the discrete classification circuit and discrete classification resistor are located off-chip.

17. The system of claim 12, wherein current measured through the powered device classification resistor determines a classification signature for the powered device according to classification steps such that a minimum classification step includes a minimum current of 0 mA and a maximum classification step includes a maximum current that is beyond a predefined current limit.

18. The system of claim 17, wherein the predefined current limit is defined by a current IEEE standard of power classification.

19. The system of claim 18, wherein the powered device is classified in a class as defined in the current IEEE standard.

20. The system of claim 18, wherein the powered device is classified in a class beyond those defined in the current IEEE standard.

21. The system of claim 17, wherein the predefined current limit is defined by the IEEE 802.3af™ standard.

22. The system of claim 17, wherein the powered device is classified in one of classes 0 to 4 for current ranging from 0 mA to approximately 51 mA in support of the IEEE 802.3af™ standard.

23. The system of claim 22, wherein the powered device is classified in a class beyond class 4 for current of approximately 51 mA or more.

24. The system of claim 17, wherein the powered device is classified in one of the following classes:
class 0 for 0 mA to 4 mA;
class 1 for 9 mA to 12 mA;
class 2 for 17 mA to 20 mA;
class 3 for 26 mA to 30 mA;
class 4 for 36 mA to 44 mA;
class 5 for 50 mA to 58 mA;
class 6 for 64 mA to 72 mA;
class 7 for 78 mA to 86 mA;
class 8 for 92 mA to 100 mA;
class 9 for 106 mA to 114 mA;

class 10 for 120 mA to 128 mA;
class 11 for 134 mA to 142 mA;
class 12 for 148 mA to 156 mA;
class 13 for 162 mA to 170 mA;
class 14 for 176 mA to 184 mA; and
class 15 for 190 mA to 198 mA.

25. The system of claim 17, wherein current measured through the discrete classification resistor is used to determine the classification signature, instead of current measured through the powered device classification resistor, when the powered device and powered device classification resistor do not support power classification for current beyond the predefined current limit.

26. A method of supplying power to a powered device, the method comprising:
    detecting the powered device;
    classifying the powered device based on current measured through a discrete classification resistor connected in series with a discrete classification circuit, the discrete classification resistor and discrete classification circuit connected between first and second terminals of the powered device such that a first terminal of the discrete classification circuit is connected to the first terminal of the powered device, a second terminal of the discrete classification circuit is connected to a first terminal of the discrete classification resistor, and a second terminal of the discrete classification resistor is connected to the second terminal of the powered device, wherein the classifying is according to a classification scheme of classification steps such that a minimum classification step includes a minimum current of 0 mA and a maximum classification step includes a maximum current that is beyond a predefined current limit; and
    supplying power to the powered device according to the classification determined in the classifying step.

27. The method of claim 26, wherein the predefined current limit is defined by a current IEEE standard of power classification.

28. The method of claim 27, wherein classifying comprises:
    classifying the powered device in a class as defined in the current IEEE standard.

29. The method of claim 27, wherein classifying comprises:
    classifying the powered device in a class beyond those defined in the current IEEE standard.

30. The method of claim 26, wherein the predefined current limit is defined by the IEEE 802.3af™ standard.

\* \* \* \* \*